No. 695,352. Patented Mar. 11, 1902.
O. THOMPSON & J. A. BALDRIDGE.
WIRE FENCE REEL.
(Application filed July 20, 1901.)
(No Model.)
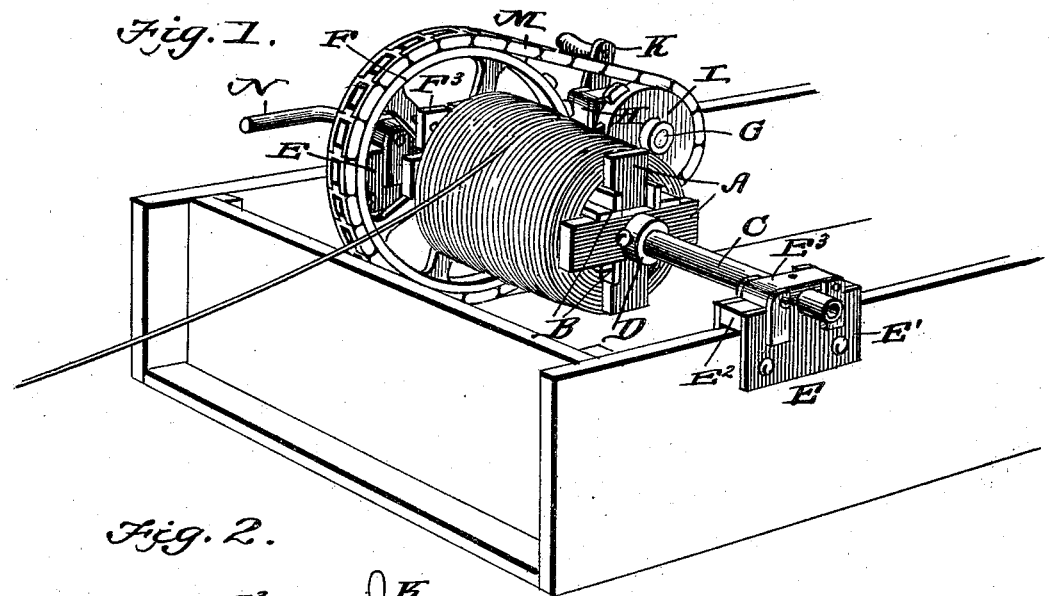
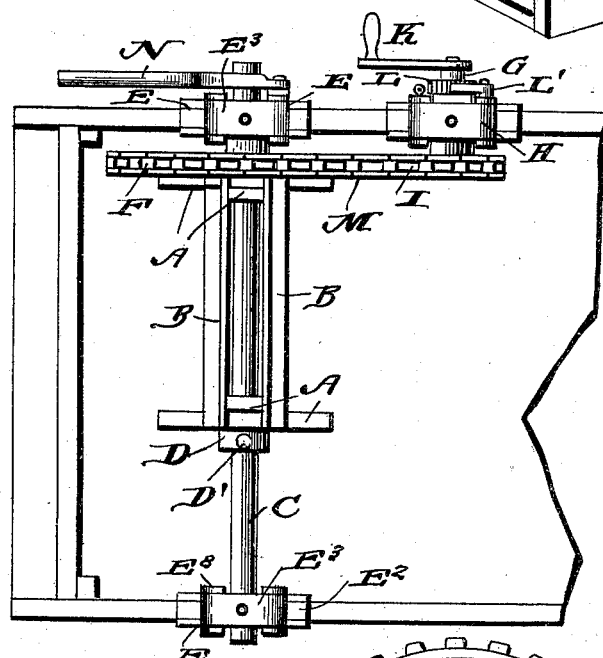
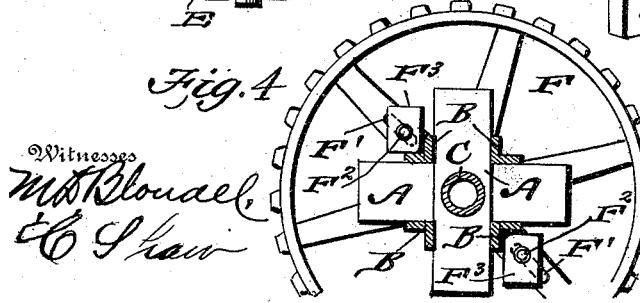
Witnesses
M. D. Bloudel
L. C. Shaw
Inventors
Oscar Thompson.
James A. Baldridge.
By O'Mara & Co
Attorneys

UNITED STATES PATENT OFFICE.

OSCAR THOMPSON AND JAMES A. BALDRIDGE, OF VINCENNES, INDIANA.

WIRE-FENCE REEL.

SPECIFICATION forming part of Letters Patent No. 695,352, dated March 11, 1902.

Application filed July 20, 1901. Serial No. 69,117. (No model.)

*To all whom it may concern:*

Be it known that we, OSCAR THOMPSON and JAMES A. BALDRIDGE, citizens of the United States, residing at Vincennes, in the county of Knox and State of Indiana, have invented a new and useful Improvement in Wire-Fence Reels, of which the following is a specification.

This invention relates generally to wire-reels, and more particularly to a fence-wire reel, which has an improvement upon the reel shown, described, and claimed in the application filed by Oscar Thompson January 28, 1901, Serial No. 45,031.

The object of the present invention is to provide an exceedingly cheap, simple, and durable construction of fence-wire reel which can be quickly and easily attached to any wagon-body for the purpose of transporting the wire and reeling or unreeling the same from the spool.

With these objects in view the invention consists in the peculiar construction of the various parts and in their novel combination and arrangement, all of which will be fully described hereinafter and pointed out in the claim.

In the drawings forming a part of this specification, Figure 1 is a view showing the practical application of our invention. Fig. 2 is a top plan view. Fig. 3 is a detail perspective view of the reel or spool proper; and Fig. 4 is a sectional elevation illustrating the manner of connecting the reel or spool with the sprocket, whereby the two are caused to move in unison.

In carrying out our invention we employ a reel or spool which consists of the cross-strips A, connected by means of the angle-pieces B, said cross-strips A having central openings A', through which the tubular shaft C is passed, a collar D being secured upon said shaft by means of a set-screw D' for the purpose of limiting the lateral movement of the reel or spool upon said shaft. The ends of the shaft C are journaled in boxes E, which are secured to the side-boards of the wagon-body, said boxes comprising the plates E', the lower block E², and the upper block E³. A sprocket-wheel F is mounted upon the tubular shaft adjacent to the end of the reel opposite collar D, two or more of the spokes of said wheel being slotted longitudinally at F' for the purpose of receiving a bolt F², which secures a block F³, said block F³ fitting into the angle of the cross-piece B, and inasmuch as two of the spokes are slotted it will of course be understood that two blocks F³ are employed, and consequently the reel or spool is locked with the sprocket-wheel F at two different points, thus causing the said sprocket-wheel and reel to move in unison.

G indicates the short shaft, which is journaled in a box H, identical with the journal-box already described, and upon the inner end of this shaft G is mounted a small sprocket I, while upon the outer end of said shaft is arranged a crank K, and also upon the shaft adjacent to the said crank K is a ratchet-wheel L, which is adapted to be engaged by the pawl L', pivoted to one side of the journal-box H. A sprocket-chain M passes around the sprocket-wheel I and also around the sprocket-wheel F, so that when the crank K is operated the sprocket-wheel F is rotated, and consequently the reel, thereby causing the wire to be reeled or unreeled therefrom. The journal-box H is preferably adjustable upon the side of the wagon-box, so as to take up any slack which may occur in the drive-chain. The end of the tubular shaft C adjacent to the sprocket F projects a short distance beyond the journal-box and is adapted to have a brake-bar N bear thereon, said brake-bar being pivoted to the outer side of the journal-box and adapted to be brought into a frictional contact with the end of the shaft C whenever it is desired to retard or check the motion of the reel or spool.

It will thus be seen that we provide an exceedingly simple and durable construction of fence-wire reel, which can be quickly and easily applied to the body of any vehicle and by means of which the fence-wire can be easily reeled or unreeled, as desired.

Having thus fully described our invention, what we claim as new, and desire to secure by Letters Patent of the United States, is—

In a device of the kind described, the combination with the tubular shaft, of a reel arranged thereon and comprising the cross-pieces and angled connecting-strips, a sprocket-wheel mounted upon the tubular shaft adjacent to one end of the reel or spool and the blocks secured to the spokes of the sprocket-wheel, said blocks being adapted to fit into the angled connecting-strips of the reel or spool, and thereby connecting the sprocket-wheel and reel or spool, substantially as described.

OSCAR THOMPSON.
JAMES A. BALDRIDGE.

Witnesses:
F. P. ANDERSON,
W. T. McCLURE.